US007546730B2

(12) United States Patent

Kubinski

(10) Patent No.: US 7,546,730 B2
(45) Date of Patent: Jun. 16, 2009

(54) HYDRAULIC VEHICLE STABILIZER SYSTEM WITH TWO-STAGE BI-ROTATIONAL HYDRAULIC PUMP SYSTEM

(75) Inventor: Paul T. Kubinski, Brooklyn Park, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 229 days.

(21) Appl. No.: 11/690,279

(22) Filed: Mar. 23, 2007

(65) Prior Publication Data

US 2007/0220880 A1 Sep. 27, 2007

Related U.S. Application Data

(60) Provisional application No. 60/785,144, filed on Mar. 23, 2006.

(51) Int. Cl.
*F15B 11/00* (2006.01)
*F16H 61/44* (2006.01)

(52) U.S. Cl. .............................. 60/476; 60/430; 60/486

(58) Field of Classification Search ................... 60/430, 60/473, 475, 476, 486
See application file for complete search history.

(56) References Cited

U.S. PATENT DOCUMENTS

| | | | | |
|---|---|---|---|---|
| 3,864,911 | A * | 2/1975 | Gellatly et al. | 60/476 |
| 3,944,097 | A | 3/1976 | Savage | |
| 4,008,571 | A * | 2/1977 | Evans | 60/486 |
| 4,417,633 | A | 11/1983 | Dunn | |
| 4,921,392 | A | 5/1990 | Wagner | |
| 4,949,805 | A | 8/1990 | Mather et al. | |
| 5,174,115 | A | 12/1992 | Jacobson et al. | |
| 5,590,731 | A | 1/1997 | Jacobson | |
| 5,711,391 | A | 1/1998 | Brandt et al. | |
| 5,713,419 | A | 2/1998 | Kaczmarski et al. | |
| 5,957,213 | A | 9/1999 | Loraas et al. | |
| 6,354,081 | B1 | 3/2002 | Burton | |
| 6,481,749 | B2 | 11/2002 | Ahlers et al. | |
| 6,551,050 | B1 | 4/2003 | Kallevig et al. | |
| 6,877,773 | B1 | 4/2005 | Bibb et al. | |
| 6,886,332 | B2 * | 5/2005 | Kubinski et al. | 60/476 |
| 6,923,285 | B1 | 8/2005 | Rossow et al. | |
| 2002/0060450 | A1 | 5/2002 | Ahlers et al. | |
| 2002/0127126 | A1 | 9/2002 | Kaempe | |

* cited by examiner

*Primary Examiner*—Thomas E Lazo
(74) *Attorney, Agent, or Firm*—Renner, Otto, Boisselle & Sklar, LLP

(57) ABSTRACT

A stabilizer system and method that can provide high speed, relatively low force extension and retraction of a stabilizer leg during a first portion of a stroke, and low speed, relatively high force extension and retraction during a second portion of the stroke. Accordingly, the stabilizer system and method takes less time to deploy than conventional stabilizer systems but without sacrificing performance.

20 Claims, 1 Drawing Sheet

HYDRAULIC VEHICLE STABILIZER SYSTEM WITH TWO-STAGE BI-ROTATIONAL HYDRAULIC PUMP SYSTEM

RELATED APPLICATION

This application claims the benefit of U.S. Provisional Application No. 60/785,144 filed Mar. 23, 2006, which is hereby incorporated herein by reference.

FIELD OF THE INVENTION

The present invention relates generally to hydraulic vehicle stabilizer systems and, more particularly, to such a system using a two-stage bi-rotational hydraulic pump. The invention also has more general applicability to bi-directional actuator systems using a two-stage bi-rotational hydraulic pump.

BACKGROUND OF THE INVENTION

A trend in the construction industry has been to utilize smaller, more versatile machinery on the job-site. For example, mini-excavators and skid-steer loaders are often used to perform a variety of tasks. In many cases, a skid-steer loader or mini-excavator is equipped with an attachment for performing a particular task. Such attachments are typically powered by an auxiliary hydraulic circuit on the skid-steer loader or mini-excavator. Numerous attachments exist for performing a variety of tasks. For example, attachments exist for allowing a skid-steer loader to be used as a backhoe, an earth auger, an angle broom, a drop hammer, a snowplow, a brush saw, etc.

When using some types of attachments, it is often desirable to use a stabilizer system to raise the vehicle's wheels off of the ground in order to provide a more stable operating foundation. Typical stabilizer systems include one or more stabilizer legs that are lowered and raised by hydraulic piston-cylinder assemblies respectively to lift and lower the vehicle relative to the ground.

When selecting a stabilizer system for a vehicle, design parameters include, among other things, the maximum load the stabilizer system must be able to accommodate, and the rate at which the stabilizer legs can be extended and/or retracted. As will be appreciated, for a stabilizer system having a pump of a given size, as the load rating of the system increases the rate at which the stabilizer legs can be extended and retracted typically decreases. Accordingly, as the load capacity increases the stabilizer system takes longer to deploy thereby making the system less convenient to use.

One way to increase the load rating and maintain the rate of extension and retraction is to use a more powerful pump. However, using a more powerful pump usually means increased costs and may also require more space.

Another problem that arises when using piston-cylinder assemblies having a relatively large diameter piston rod, as is often the case in a vehicle stabilizer system where heavy loads are encountered. In such assemblies, the amount of fluid displaced from the piston side chamber of the cylinder during retraction of the piston rod is considerably greater than the amount of fluid flowing into the rod side chamber of the cylinder.

SUMMARY OF THE INVENTION

The present invention provides a stabilizer system and method that can provide high speed, relatively low force extension and retraction of a stabilizer leg during a first portion of a stroke, and low speed, relatively high force extension and retraction during a second portion of the stroke. Accordingly, the invention provides a stabilizer system and method that takes less time to deploy than conventional stabilizer systems but without sacrificing performance.

According to one aspect of the invention, a hydraulic system particularly suited for operating a double-acting hydraulic actuator in such a stabilizer system comprises:

a first bi-directional pump and a second bi-directional pump that together can be coupled to and operatively driven bi-directionally by a prime mover, each pump having extend and retract ports that function as pressure and suction pumps depending on the direction of operation of the pumps;

a first extend circuit portion for fluidly connecting the extend port of the first pump to an extend chamber of the hydraulic actuator;

a first retract circuit portion for fluidly connecting the retract port of the first pump to a retract chamber of the hydraulic actuator;

a second extend circuit portion for fluidly connecting the extend port of the second pump to the first extend circuit portion;

a second retract circuit portion circuit for fluidly connecting the retract port of the second pump to the first retract circuit portion;

a non-return check valve connecting the second extend circuit portion to the first extend circuit portion for blocking reverse flow from the first extend circuit portion to the second extend circuit portion while permitting flow from the second extend circuit portion to the first extend circuit portion;

an unloader valve unloader valve connected to the second extend circuit portion between the non-return check valve and the extend port of the second pump, the unloader valve being responsive to fluid pressure in the first extend circuit portion such that unloader valve will open to a drain path when the fluid pressure in the first extend circuit portion increases above a predetermined value;

a pressure responsive return check valve connecting the second retract circuit portion to the first retract circuit portion for normally blocking flow reverse flow from the first retract circuit portion to the second retract circuit portion while permitting flow from the second retract circuit portion to the first retract circuit portion, the return check valve being responsive to pressure in the second extend circuit portion to allow reverse flow when the pumps are being operated to extend the actuator; and an excess fluid dump valve connected to the first extend circuit portion for diverting to a drain path excess fluid exiting from the extend side of the actuator during actuator retraction, the excess fluid dump valve being normally closed during actuator extension and open in response to pressure in the first extend circuit portion during actuator retraction.

According to another aspect of the invention, a stabilizer system comprises:

a hydraulic cylinder assembly having a piston and rod supported therein;

a low pressure bi-rotational pump element connected via flow passages to a piston side and a rod side of the hydraulic cylinder assembly;

a high pressure bi-rotational pump element connected via flow passages to the piston side and the rod side of the hydraulic cylinder assembly;

wherein when the pump elements are rotated in a first direction fluid is supplied to the piston side of the cylinder for extending the rod by the high pressure bi-rotational pump element at least when a system pressure on the piston side exceeds a prescribed level, and by the low pressure bi-rotational pump element at least when the system pressure on the piston side is below the prescribed level;

wherein when the pump elements are rotated in a second direction fluid is supplied to the rod side of the cylinder for retracting the rod by the high pressure bi-rotational pump element at least when the system pressure on the rod side exceeds the prescribed level, an not by the low pressure bi-rotational pump; and wherein the piston side of the hydraulic cylinder has a larger area than the rod side of the hydraulic cylinder such that during retraction of the hydraulic cylinder a greater amount of fluid exits the piston side of the hydraulic cylinder than enters the rod side of the hydraulic cylinder.

According to a further aspect of the invention, a hydraulic circuit connectable to a hydraulic cylinder for extending and retracting a rod of the hydraulic cylinder comprises:

a first flow passage connectable to a piston side of the hydraulic cylinder and second flow passage connectable to a rod side of the hydraulic cylinder;

a low pressure bi-rotational pump element connected to the flow passages for supplying fluid thereto; and a high pressure bi-rotational pump element connected to the flow passages for supplying fluid thereto;

wherein when the pump elements are rotated in a first direction fluid is supplied to the first flow passage by the high pressure bi-rotational pump element being at least when a system pressure in the first passage exceeds a prescribed level, and the low pressure bi-rotational pump element at least when the system pressure in the first passage is below the prescribed level;

wherein when the pump elements are rotated in a second direction fluid is supplied to the second passage by the high pressure bi-rotational pump element at least when the system pressure in the second passage exceeds the prescribed level, and outflow from the low pressure bi-rotational pump is bypassed around the second passage.

The foregoing and other features of the invention are more particularly described in the following detailed description when considered in conjunction with the drawings.

DETAILED DESCRIPTION

Figure 1:
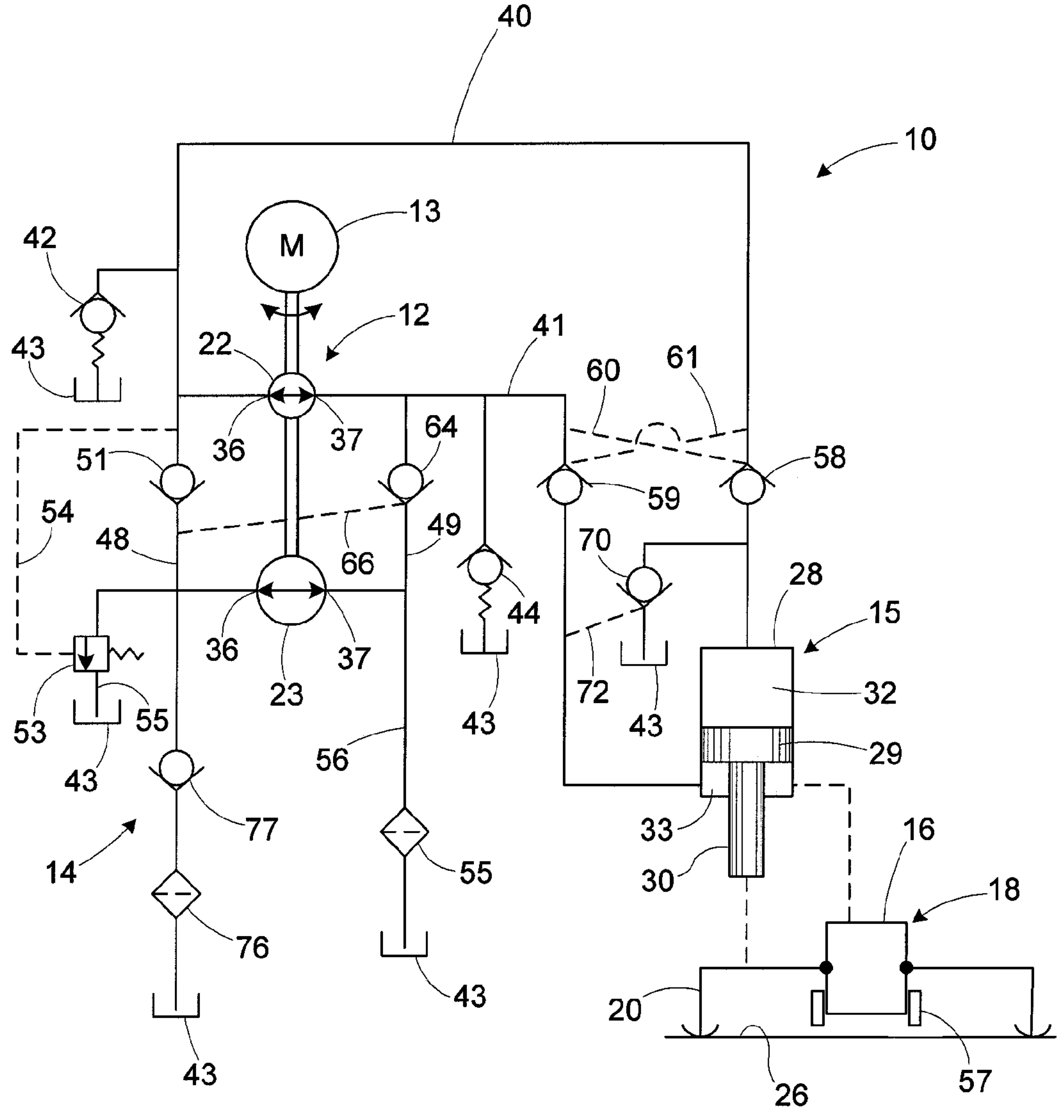
FIG. 1 is a schematic diagram illustrating an exemplary hydraulic vehicle stabilizer system according to the invention.

Referring now to the drawing, an exemplary hydraulic system according to the invention is generally indicated at 10. The system 10 generally comprises a pump assembly 12 that can be driven by a prime mover such as a reversible motor 13, in particular a DC motor, in both directions, and hydraulic circuitry 14 for connecting the pump assembly to a hydraulic actuator 15. As illustrated, the actuator 15 can be mounted to a body 16 of a vehicle 18 and connected to a stabilizer leg 20 for lowering and raising the leg upon extension and retraction of the actuator. The vehicle typically will be equipped with one or more additional stabilizer legs each serviced by a respective pump assembly (not shown) and associated hydraulic circuitry (not shown) that may be the same as that herein described. The stabilizer legs can be lowered to raise the vehicle body and support the vehicle body independently of its suspension.

As will be appreciated by those skilled in the art, a more powerful pump assembly can be used to increase the speed at which the vehicle can be raised and lowered. This however means increased costs and usually a larger package size and increased weight.

In accordance with the present invention, the pump assembly 12 includes a pair of bi-rotational pumps 22 and 23, connected to the reversible motor 13 for conjoint operation. The pump 22 preferably is a high pressure, low volume pump whereas the pump 23 preferably is a low pressure, high volume pump. As explained in greater detail below, both pumps supply hydraulic fluid to the hydraulic actuator 15 for rapid lowering of the stabilizer leg 20 under low load conditions until the stabilizer leg engages the ground 26. For the remainder of the stroke, the high pressure pump supplies high pressure fluid to the hydraulic actuator under high load conditions to lift the vehicle body off the wheels. To raise the stabilizer leg and lower the vehicle body back onto the wheels, reverse flow from the high pressure pump is used to retract the hydraulic actuator.

Although herein described as part of a vehicle stabilizer system, the hydraulic system 10 can be adapted for a variety of other applications where a two-stage actuator having extend and retract modes is necessary to move or lift an object. Such other applications include, for example, moving the boom on an aerial lift truck. In addition, while the present invention is particularly useful for a hydraulic cylinder with a relatively large diameter piston rod, principles so the invention may find application with other types of hydraulic actuators.

The pumps 22 and 23 may be gear pumps including intermeshing gears that are sized appropriately for the particular application. Other types of pumps could also be used. For conjoint operation, one gear component of one of the pumps can be fixedly connected (such as by a coupling) to a gear component of the other of the pumps, such that all the gear components are operational together.

The hydraulic circuitry 14 connects the pumps 22 and 23 to one another an to the double-acting hydraulic actuator 15 that includes a cylinder 28 and a piston 29 to which a piston rod 30 is connected, the piston separating a piston-side or extend chamber 32 of the cylinder from a rod-side or retract chamber 33 of the cylinder. The pumps each have extend and retract ports 36 and 37 that provide pressure or suction depending on the movement direction of the pumps.

The hydraulic circuitry 14 includes a first extend circuit portion 40 for fluidly connecting the extend port 36 of the first pump 22 to the piston-side chamber 32 of the hydraulic actuator 15, a first retract circuit portion 41 for fluidly connecting the retract port 37 of the first pump to the rod-side chamber 33 of the hydraulic actuator, an extend relief valve 42 connected to the first extend circuit portion 40 between the first pump 22 and the hydraulic actuator 15. The extend relief valve 42 is operationally responsive to fluid pressure in the first extend circuit portion 40 for allowing flow from the first extend circuit portion to a reservoir 43 (e.g. tank) when the fluid pressure in the first extend circuit portion increases above a prescribed amount, and a retract relief valve 44 connected to the first retract circuit portion 41 and operationally responsive to fluid pressure in the first retract circuit portion for allowing flow from the first retract circuit portion to the reservoir 43 when the fluid pressure in the first retract circuit portion increases above a prescribed amount. The extend and retract relief valves may be normally closed, adjustable, spring-biased ball valves.

The hydraulic circuitry 14 further includes a second extend circuit portion 48 for fluidly connecting the extend port 36 of the second pump 23 to the first extend circuit portion 40, and a second retract circuit portion 49 for fluidly connecting the extend port 37 of the second pump 23 to the first retract circuit portion 41. The second extend circuit is connected to the first retract circuit via non-return check valve 51 whereby reverse flow from the first extend circuit portion 40 to the second extend circuit portion 48 is normally blocked while permitting flow from the second extend circuit portion to the first extend circuit portion.

An unloader valve 53 is connected to the second extend circuit portion 48 between the non-return check valve 51 and the extend port 36 of the second pump 23. The unloader valve is responsive via a pilot signal line 54 to fluid pressure in first extend circuit portion 40. The unloader valve may comprise a normally closed, spring-biased ball valve with a spool valve portion responsive to pressure applied across the pilot signal line. The unloader valve fluidly connects the second pump 23 through a second drain path 55 to the reservoir 43 when the fluid pressure in the first extend circuit portion increases above a predetermined value when the actuator is under high load conditions, such as after the stabilizer leg 20 has contacted the ground 26 and is raising the vehicle body 16 off the wheels 57.

Accordingly, both pumps 22 and 23 supply fluid to the extend side of the actuator 15 until the load on the actuator causes the pressure in the first extend circuit portion 40 to increase above the set value of the unloader valve 53. Thereafter, the output of the second pump 23 is dumped to the reservoir 43 while the first pump continues alone to supply high pressure flow to the extend side of the actuator. This will result in rapid extension of the actuator and in turn rapid lowering of the stabilizer leg until the high load condition is encountered, i.e., the stabilizer leg contacting the ground. Then, high pressure fluid is supplied to the extend side of the actuator to lift the vehicle off its wheels, albeit at a slower rate but typically over a much shorter distance than the distance traversed by the stabilizer legs during initial lowering into contact with the ground. The second pump 23 is effectively isolated from the actuator during higher loads and pressures and the first pump 22 can be driven by the prime mover 13 to higher pressures. As will be appreciated, the extend relief valve 42 will be set at a value greater than the setting of the unloader valve 53 to allow for such higher pressures being supplied to the extend side of the actuator.

During extension of the actuator 15, fluid from the retract side is returned to the retract ports 37 of the pumps 22 and 23 via the first and second retract circuit portions 41 and 49. In addition, make-up fluid is supplied from the reservoir 43 to the retract ports 37 of the pumps via a filter 55 in a branch circuit portion 56. The make-up fluid compensates for the rod volume differential of the hydraulic actuator. That is, during extension of the actuator, the fluid volume supplied to the extend side of the actuator exceeds the fluid volume being exhausted from the retract side of the actuator because of the volume of the rod extending through the retract chamber of the actuator.

To maintain the piston 29 of the actuator 15 in a set position when the motor 13 is shut down, a pair of check valves 58 and 59 are provided in the extend and retract circuit portions 40 and 41, respectively, between the pumps 22 and 23 and the actuator 15. The valves 58 and 59 are responsive to pressure in the opposite circuit portion via pilot signal lines 60 and 61 and are held open when the pumps are operating, and closed when they are not. The check valves may be simple spring-biased ball valves.

As thus far described, a problem arises because of the rod volume differential. During retraction of the actuator 15, the fluid output of the actuator far exceeds the fluid input. If one were to rely on the retract relief valve 44 to dissipate the excess fluid without creating a lot of wasted energy, the system would have to be very large. It has been discovered that dissipating the rod volume excess over the retract relief valve 44 would require the system to retract at the retract relief valve pressure setting. This would cause the load on the motor 13, e.g. the amps drawn by a DC motor, to be very high. If one were to minimize the load, this could create the possibility that the actuator would not be able to retract if the actuator encountered high resistance, such as may occur if the stabilizer leg is stuck in mud or caught by an obstruction.

In accordance with the present invention, a return check valve 64 is provided between the first retract circuit portion 41 and the second retract circuit portion 49. As a result, only the first pump 22 will generate flow to the rod (retract) side of the actuator during retraction of the actuator. Because of the small differential between the diameters of the rod 30 and piston 29 (relatively small cross-sectional area of the rod-side chamber of the actuator, the actuator will retract at a rate that can be similar to the high speed extend rate of the actuator when both pumps are supplying fluid to the extend side of the actuator.

In order to allow the return fluid from the retract side of the actuator to flow to the retract port of the second pump 23 during extension of the actuator, the return check valve 64 is responsive to pressure in the second extend circuit portion 48 at the extend port 36 of the second pump via a pilot signal line 66 (in an alternative arrangement the pilot signal line may supply pressure from the first extend circuit to keep the valve 64 open at all times during extension of the actuator). In this manner, the check valve 64 will be held open when the pumps are operating to extend the actuator. Otherwise, the check valve would block flow to the second pump while allowing flow in the reverse direction, although allowing make-up fluid to be drawn therethrough from the reservoir when the actuator is being extended.

Further in accordance with the invention, another pilot-operated valve 70 is provided to divert to the reservoir 43 the excess fluid exiting the extend side of the actuator during actuator retraction. The pilot-operated valve is closed during actuator extension. During actuator retraction, the valve will be held open by pressure in the first extend circuit portion supplied via pilot signal line 72. This enables the rod side of the piston to see the maximum pressure permitted by the retract relief valve as may be needed if resistance is encountered during retraction, such as might occur if the stabilizer leg is stuck in the mud or encounters a tree trunk.

The reservoir connections 43 described above can be to a common reservoir or to different reservoirs that may be fluidly interconnected. The reservoir connections each represent a drain path for hydraulic fluid.

The operation of the hydraulic system 10 should be apparent from the above, but will also be briefly discussed. During operation in the extend mode of the actuator, the pumps 22 and 23 are operated conjointly to provide fluid through the extend circuit portion into the extend chamber of the actuator. Since the flow from the retract chamber of the actuator is less than the flow being provided to the extend chamber, the pressure from the actuator usually will be insufficient to activate the retract relief valve 44, and as such, this valve 44 stays shut, with the entire flow being provided to the two pumps. As above described, the check valve 64 will be held open by pressure at the extend sides of the pumps and in particular the second pump. This allows flow from the retract chamber of the actuator to flow to the retract ports of both pumps for rapid withdrawal of the fluid from the retract chamber. Makeup flow is provided from the reservoir through a filter 43 to compensate for the smaller flow being provided from the retract chamber.

In the low-load, extend mode of operation, the unloader valve 53 remains closed, and flow from both pumps is provided through first and second extend circuit portions to the extend chamber of the actuator, and both pumps suck fluid from the retract chamber of the actuator.

In the high-load, extend mode of operation, that is, when pressure in the extend circuit portion at the extend port 36 of the first pump 22 increases above the set point of the unloader valve 53, the unloader valve opens, and directs flow from the second pump 23 through the drain path 55 to the reservoir 43. As a result, the second pump is effectively isolated, and only the flow from the first pump is applied to the extend chamber of the actuator. The first pump 22 can thereby be driven to higher pressures to move the actuator.

During the retract mode of operation, the pumps 22 and 23 are operated in the reverse mode and fluid is provided to the retract chamber of the actuator by the first pump 22. Pressure in the first retract circuit portion will open the excess fluid bypass valve 70 thereby allowing excess fluid being exhausted from the extend side of the actuator to be dumped to the reservoir. The balance of the flow will be supplied to the extend port of the first pump 22. The second pump is again effectively isolated, the pump drawing fluid from the reservoir 43 via a filter 76 and check valve 77, and discharging the fluid back to the reservoir via the filter 55.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic system for operating a double-acting hydraulic actuator including a cylinder and a piston to which a piston rod is connected, the piston separating an extend chamber of the cylinder from a retract chamber of the cylinder, the hydraulic system comprising:

a first bi-directional pump and a second bi-directional pump that together can be coupled to and operatively driven bi-directionally by a prime mover, each pump having extend and retract ports that function as pressure and suction pumps depending on the direction of operation of the pumps;

a first extend circuit portion for fluidly connecting the extend port of the first pump to the extend chamber of the hydraulic actuator;

a first retract circuit portion for fluidly connecting the retract port of the first pump to the retract chamber of the hydraulic actuator;

a second extend circuit portion for fluidly connecting the extend port of the second pump to the first extend circuit portion;

a second retract circuit portion for fluidly connecting the retract port of the second pump to the first retract circuit portion;

a non-return check valve connecting the second extend circuit portion to the first extend circuit portion for blocking reverse flow from the first extend circuit portion to the second extend circuit portion while permitting flow from the second extend circuit portion to the first extend circuit portion;

an unloader valve connected to the second extend circuit portion between the non-return check valve and the extend port of the second pump, the unloader valve being responsive to fluid pressure in the first extend circuit portion such that unloader valve will open to a drain path when the fluid pressure in the first extend circuit portion increases above a predetermined value;

a pressure responsive return check valve connecting the second retract circuit portion to the first retract circuit portion for normally blocking flow reverse flow from the first retract circuit portion to the second retract circuit portion while permitting flow from the second retract circuit portion to the first retract circuit portion, the return check valve being responsive to pressure in the second extend circuit portion to allow reverse flow when the pumps are being operated to extend the actuator; and an excess fluid dump valve connected to the first extend circuit portion for diverting to a drain path excess fluid exiting from the extend side of the actuator during actuator retraction, the excess fluid dump valve being normally closed during actuator extension and open in response to pressure in the first retract circuit portion during actuator retraction.

2. A hydraulic system as set forth in claim 1, further comprising an extend relief valve connected to the first extend circuit portion and operationally responsive to fluid pressure in the first extend circuit portion for allowing flow from the first extend circuit portion to a drain path when the fluid pressure in the first extend circuit portion increases above a prescribed amount.

3. A hydraulic system as set forth in claim 2, further comprising a retract relief valve connected to the first retract circuit portion and operationally responsive to fluid pressure in the first retract circuit portion for allowing flow from the first retract circuit portion to a drain path when the fluid pressure in the first retract circuit portion increases above a prescribed amount.

4. A system as set forth in claim 1, further comprising the prime mover coupled to both pumps.

5. A system as set forth in claim 1, wherein the first pump is a high pressure, low volume pump, and the second pump is a low pressure, high volume pump.

6. A system as set forth in claim 1, further comprising the actuator.

7. A stabilizer system comprising:

a hydraulic cylinder assembly having a piston and rod supported therein;

a low pressure bi-rotational pump element connected via flow passages to a piston side and a rod side of the hydraulic cylinder assembly;

a high pressure bi-rotational pump element connected via flow passages to the piston side and the rod side of the hydraulic cylinder assembly;

wherein when the pump elements are rotated in a first direction fluid is supplied to the piston side of the cylinder for extending the rod by the high pressure bi-rotational pump element at least when a system pressure on the piston side exceeds a prescribed level, and by the low pressure bi-rotational pump element at least when the system pressure on the piston side is below the prescribed level;

wherein when the pump elements are rotated in a second direction fluid is supplied to the rod side of the cylinder for retracting the rod by the high pressure bi-rotational pump element at least when the system pressure on the rod side exceeds the prescribed level, an not by the low pressure bi-rotational pump; and wherein the piston side of the hydraulic cylinder has a larger area than the rod side of the hydraulic cylinder such that during retraction of the hydraulic cylinder a greater amount of fluid exits the piston side of the hydraulic cylinder than enters the rod side of the hydraulic cylinder.

8. A stabilizer system as set forth in claim 7, further comprising a flow control device between the rod side of the hydraulic cylinder and the low pressure pump that when open and closed respectively permits and blocks flow of fluid between to the rod side of the hydraulic cylinder assembly and the low pressure pump, whereby during the extending of the rod the pressure at an outlet of the low pressure pump maintains the check valve in an open state such that fluid can flow to an inlet of the low pressure pump from the rod side of the hydraulic cylinder assembly.

9. A stabilizer system as set forth in claim 8, wherein the check valve is a pilot operated check valve whereby during the extending of the rod the pressure at an outlet of the low pressure pump maintains the check valve in an open state such that fluid can flow to an inlet of the low pressure pump from the rod side of the hydraulic cylinder assembly.

10. A stabilizer system as set forth in claim 7, further comprising a pilot operated check valve between the piston side of the hydraulic cylinder and a reservoir, the pilot operated check valve configured to remain closed during extension of the rod and to open during retraction of the rod in response to pressure at the rod side of the hydraulic cylinder such that excess fluid from the piston side of the hydraulic cylinder can flow to the reservoir.

11. A stabilizer as set forth in claim 7, further comprising a stabilizer leg coupled to the rod, the stabilizer leg extendable and retractable in response to movement of the rod and configured to engage the ground for supporting a vehicle when secured thereto.

12. A vehicle having a frame, at least one wheel for supporting the vehicle for movement over a surface, and the stabilizer system as set forth in claim 7, wherein the stabilizer system is mounted to the vehicle and further includes a stabilizer leg extendable and retractable in response to movement of the rod and configured to engage the ground for supporting the vehicle.

13. A stabilizer system as set forth in claim 7, wherein the high pressure pump and low pressure pump are part of a dual-stage bi-rotational pump unit.

14. A stabilizer system as set forth in claim 7, wherein the high pressure pump and low pressure pump are driven by an electric motor.

15. A stabilizer system as set forth in claim 14, wherein the electric motor is a DC motor.

16. A hydraulic circuit connectable to a hydraulic cylinder for extending and retracting a rod of the hydraulic cylinder comprising:

a first flow passage connectable to a piston side of the hydraulic cylinder and second flow passage connectable to a rod side of the hydraulic cylinder;

a low pressure bi-rotational pump element connected to the flow passages for supplying fluid thereto; and a high pressure bi-rotational pump element connected to the flow passages for supplying fluid thereto;

wherein when the pump elements are rotated in a first direction fluid is supplied to the first flow passage by the high pressure bi-rotational pump element being at least when a system pressure in the first passage exceeds a prescribed level, and the low pressure bi-rotational pump element at least when the system pressure in the first passage is below the prescribed level;

wherein when the pump elements are rotated in a second direction fluid is supplied to the second passage by the high pressure bi-rotational pump element at least when the system pressure in the second passage exceeds the prescribed level, and outflow from the low pressure bi-rotational pump is bypassed around the second passage.

17. A hydraulic circuit as set forth in claim 16, further comprising a check valve between the second flow passage and the low pressure pump that when open and closed respectively permits and blocks flow of fluid between the second flow passage and the low pressure pump.

18. A hydraulic circuit as set forth in claim 17, wherein the check valve is a pilot operated check valve whereby during rotation of the pumps in the first direction the pressure at an outlet of the low pressure pump maintains the check valve in an open state such that fluid can flow to an inlet of the low pressure pump from the second flow passage.

19. A hydraulic circuit as set forth in claim 16, further comprising a pilot operated check valve connecting the first flow passage to a reservoir, the pilot operated check valve is configured to remain closed when fluid is supplied to the first flow passage by at least one of the pump elements, and to open when fluid is supplied to the second flow passage by at least one of the pump elements, wherein the pilot operated check valve operates in response to pressure in the second flow passage.

20. A stabilizer system comprising hydraulic circuit as set forth in claim 16 and a hydraulic cylinder having a piston side coupled to the first flow passage and a rod side couple to the second flow passage.

* * * * *